(No Model.) 5 Sheets—Sheet 1.

G. H. HERSEY.
HOT WATER OR STEAM HEATER.

No. 494,676. Patented Apr. 4, 1893.

WITNESSES.
James R. Mansfield
C. W. Seville

INVENTOR.
George H. Hersey
By
Alexander & Dowell
attorneys (No Model.) 5 Sheets—Sheet 2.

G. H. HERSEY.
HOT WATER OR STEAM HEATER.

No. 494,676. Patented Apr. 4, 1893.

WITNESSES. INVENTOR.

(No Model.) 5 Sheets—Sheet 3.

G. H. HERSEY.
HOT WATER OR STEAM HEATER.

No. 494,676. Patented Apr. 4, 1893.

WITNESSES.
James R. Mansfield
C. W. Seville

INVENTOR.
George H. Hersey
By Alexander & Dowell
Attorneys (No Model.) 5 Sheets—Sheet 4.

G. H. HERSEY.
HOT WATER OR STEAM HEATER.

No. 494,676. Patented Apr. 4, 1893.

Fig. 9ᵃ

WITNESSES.
James R. Mansfield
C. W. Seville

INVENTOR.
George H. Hersey
By
Alexander & Dowell
Attorneys (No Model.) 5 Sheets—Sheet 5.

G. H. HERSEY.
HOT WATER OR STEAM HEATER.

No. 494,676. Patented Apr. 4, 1893.

WITNESSES. INVENTOR.

UNITED STATES PATENT OFFICE.

GEORGE H. HERSEY, OF PASSAIC, NEW JERSEY, ASSIGNOR TO HART & CROUSE, OF UTICA, NEW YORK.

HOT-WATER OR STEAM HEATER.

SPECIFICATION forming part of Letters Patent No. 494,676, dated April 4, 1893.

Application filed October 19, 1892. Serial No. 449,348. (No model.)

*To all whom it may concern:*

Be it known that I, GEORGE H. HERSEY, of Passaic, in the county of Passaic and State of New Jersey, have invented certain new and useful Improvements in Hot-Water or Steam Heaters; and I do hereby declare that the following is a full, clear, and exact description thereof, reference being had to the accompanying drawings, and to the letters of reference marked thereon, which form part of this specification.

This invention is an improved water heater, or steam boiler for heating purposes especially designed for use in connection with a series of radiators in buildings; and its object is to provide an improved sectional boiler which can be made of any size desired by the employment of more or less sections.

It consists in the novel construction of the front, rear, and water back sections, and of the intermediate similar sections. Each one of the several sections is a complete heater itself and has no direct communication with adjoining sections; each section being also upright constitutes a complete transverse vertical section of the boiler.

It further consists in other novel details of construction and combinations of parts hereinafter described.

Figure 1:
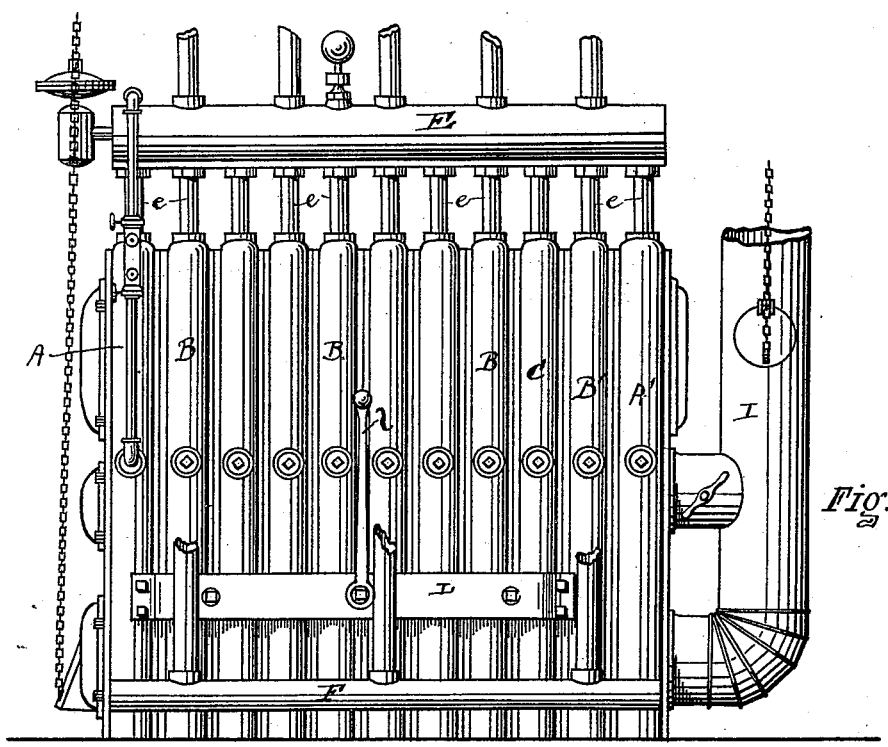
Figure 2:
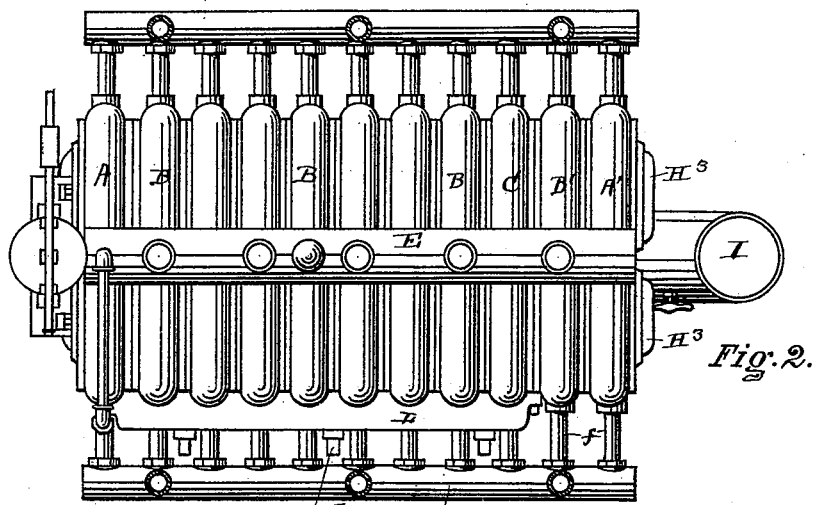
Figure 3:
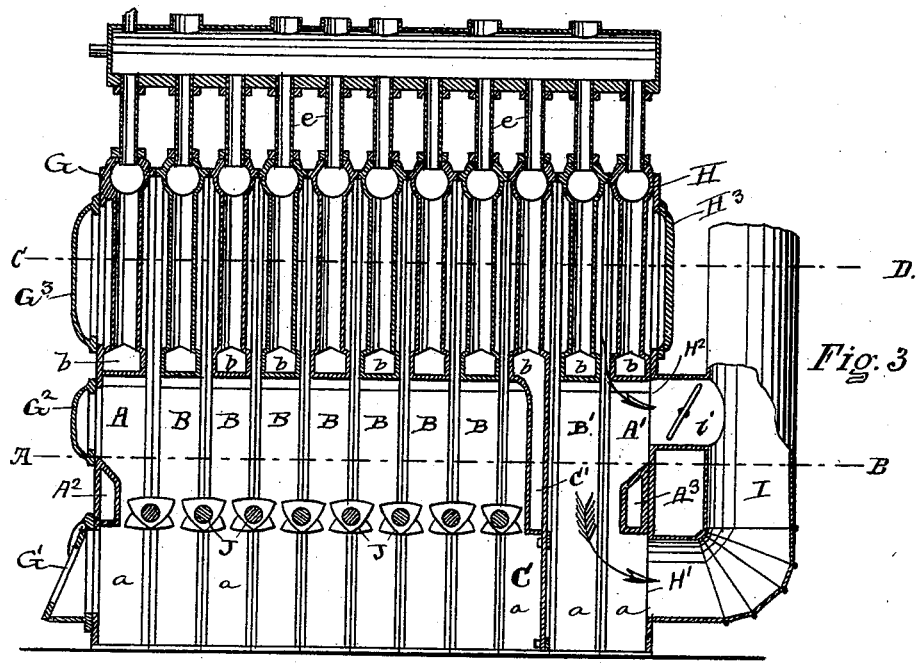
Figure 4:
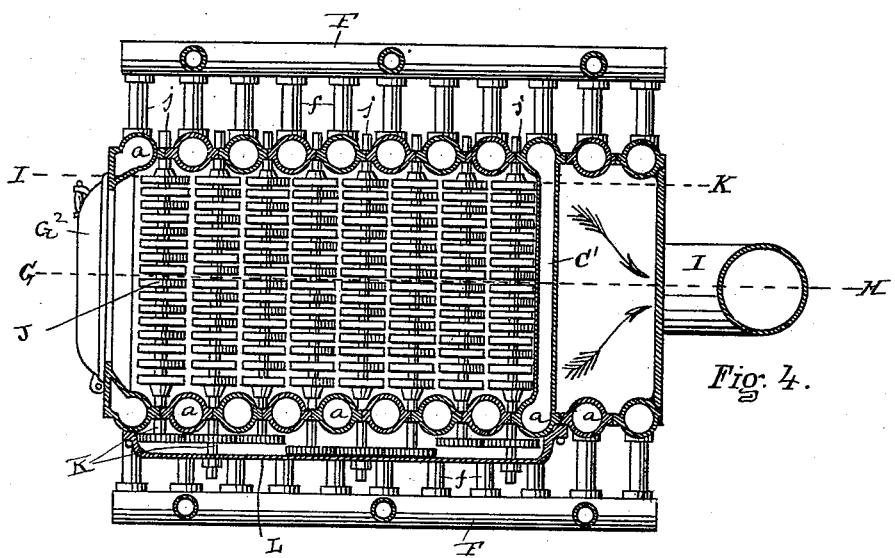
Figure 6:
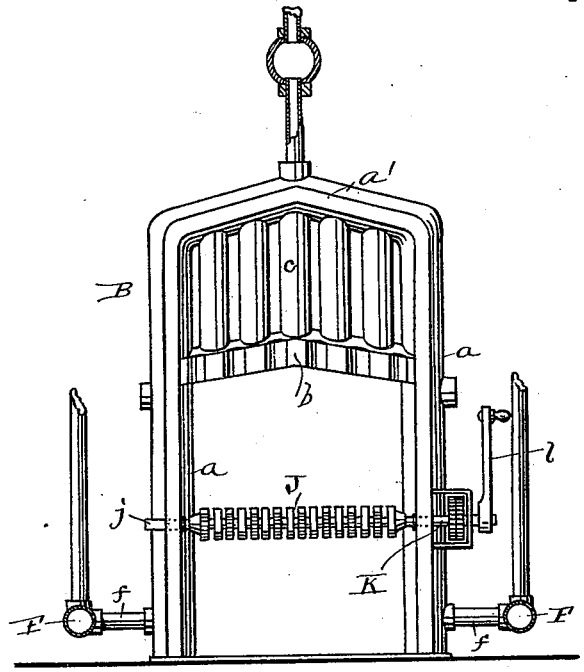
Figure 5:
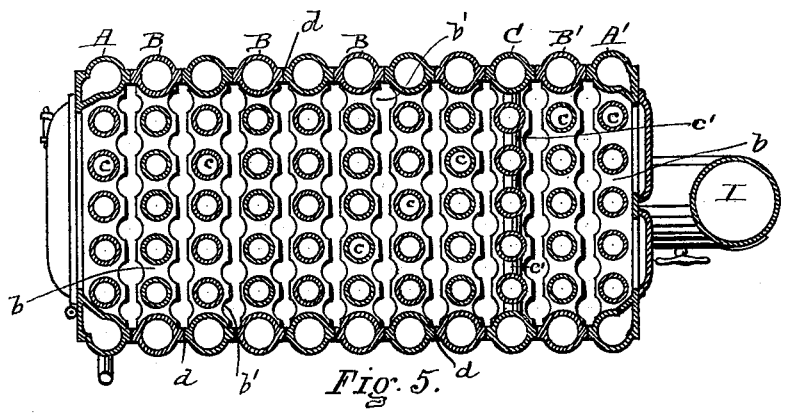
Figures 7, 8:
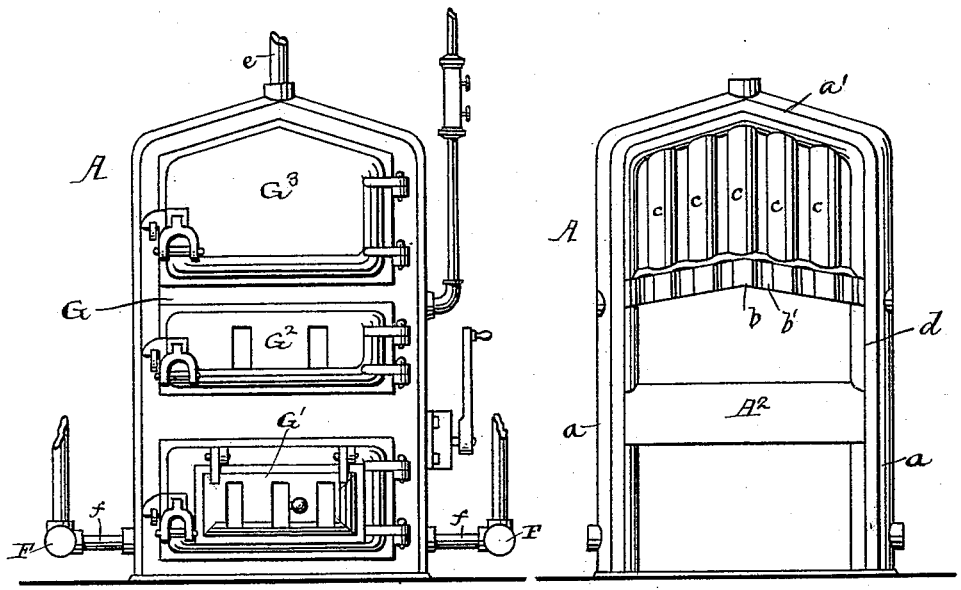
Figure 9:
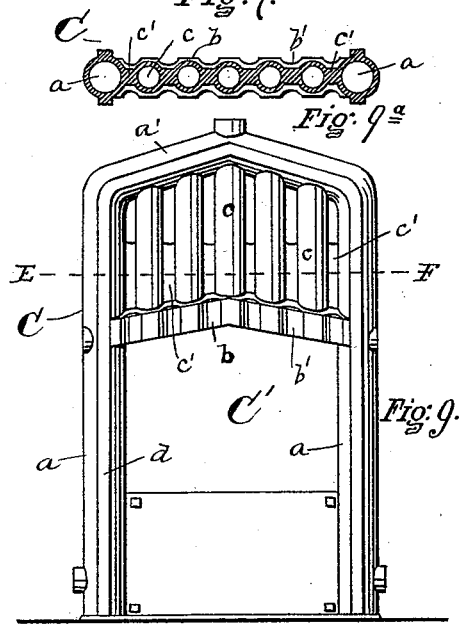
Figure 10:
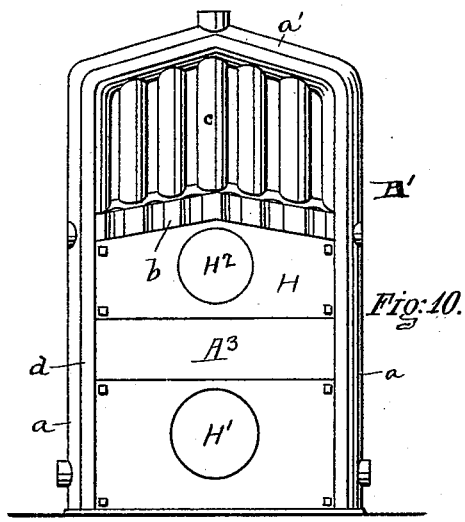
Figure 11:
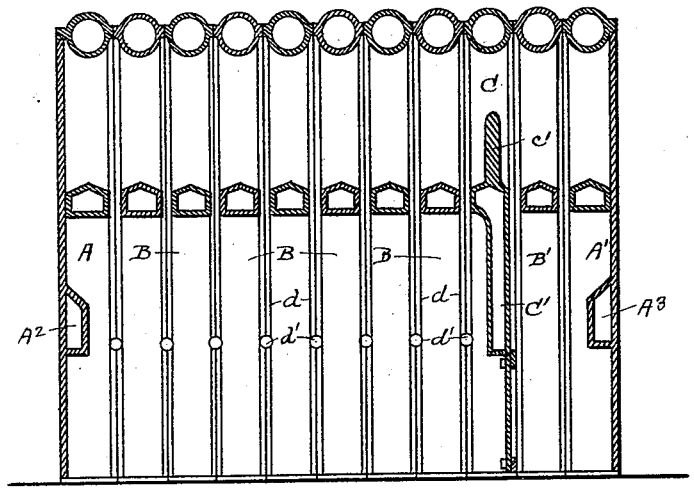
Figure 12:
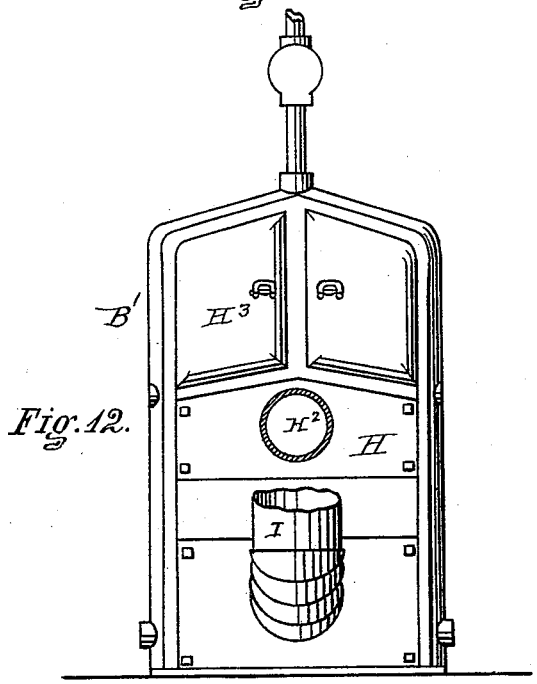

Referring to the drawings by letters:—Figure 1 is a side elevation of the water heater or steam boiler. Fig. 2 is a top view thereof. Fig. 3 is a vertical longitudinal section of the same on the line G—H of Fig. 4. Fig. 4 is a horizontal transverse section on the line A—B of Fig. 3. Fig. 5 is a similar section on line C—D of Fig. 3. Fig. 6 is a view of one of the intermediate sections. Fig. 7 is a front view of front section with plate and doors; Fig. 8 a view of front section without doors; Fig. 9 a face view of "bridge wall" and water fire back section. Fig. 9ª is a transverse sectional view of the water back section on line E—F of Fig. 9. Fig. 10 is a rear view of the rear section with plate but without doors. Fig. 11 is a vertical longitudinal section on line I—K of Fig. 4. Fig. 12 is a rear view of rear section with plate and doors.

The heater is composed of a series of vertical sections, to wit:—a front section A, a series of intermediate sections B, a fire back section C, another intermediate section B', and a rear section A'. All the sections are roughly U-shaped having vertical tubular side legs $a$, $a$, which unite at top in an arch $a'$ as shown. Below this top is an arched tubular portion $b$, highest at center and communicating at its ends with the legs $a$ near the centers thereof. From the upper side of this portion $b$ rise a series of tubes $c$, $c$, which enter the arch $a'$ at the section as shown. The legs $a$, top $a'$ portion $b$, and tubes $c$ of each section are preferably cast integral so that water can circulate therethrough and the entire body of water in the section be evenly heated, and a thorough water circulation be maintained therein. On the meeting faces of the adjoining sections are formed ribs $d$, so that when two sections are placed side by side, these ribs abut and slightly separate the hollow portions of the sections from each other.

The several sections may be bound together after being placed side by side in any suitable manner, and the whole inclosed by any suitable non-heat conducting or other covering if desired; these features being old and well understood need no further description herein. Each section is also provided with suitable water inlet and exit openings as shown; each communicates at top through pipe joints $e$, $e$, with a common water dome E, and each communicates at its side, near the bottom of the legs with a common supply pipe or pipes F, F, by means of the pipe joints $f$, $f$, as shown. The several pipes leading to the radiator may be connected to the drum. The several return pipes connected to pipes F, F, if desired, or, as is obvious the pipes $e$, and $f$, of each section might lead directly to and from a single radiator, so that an independent water circulation could be had between each section and a radiator. The meeting faces of the arched portions $b$, are recessed intermediate the tubes $c$, as indicated at $b'$ and shown most clearly in Fig. 5 so as to allow ample space for the heated products of combustion to rise between adjoining portions $b$ and then circulate between the tubes $c$. Thus far the several sections are similar in construction.

The front section A is provided with a transverse hollow limb $A^2$, (about midway portion $b$ and the lower ends of legs $a$) which communicate at its ends with legs $a$ so as to form a water passage therebetween. The outer side of this section is covered by a plate or plates G in which are several door openings closed by suitable doors as shown. The lowest opening covered by door G' communicates with the ash pit of the furnace below limb $A^2$. The highest opening covered by door $G^3$ is above portion $b$ to allow access to flues $c$, and the intermediate section covered by door $G^2$ is between portion $b$ and limb $A^2$ to admit of access to the ash pit. The rear section A' has a similarly situated limb $A^3$ and is covered exteriorly by a plate or plates H in which are suitable flue openings H' and $H^2$, respectively below and above limb $A^3$ the former communicating with the smoke pipe or flue I, and the latter also communicating with said flue by a pipe $i$ in which is a valve or damper. Two door openings are made in plate H opposite flues $c, c$, and closed by suitable doors $H^3$ as shown. The plates G and H may be formed separate from or integral with the sections A, A' as may be found desirable. The fire back section C has a transverse hollow partition C' between its legs $a$ extending below the fire chamber and communicating at top with portion $b$ of said section, see Fig. 3, and at its ends with the water legs $a$ of said section, see Fig. 4. The adjoining tubes $c$ of said section are connected by webs $c'$ which extend from the top of portion $b$ to about half the height of the tubes $c$, see Figs. 9 and $9^a$. The end tubes of said section are similarly connected by webs to the legs $a$. These webs, with their connected parts $b$, and $c$, constitute the "bridge wall" of the furnace, and partition C' forms the fire-back thereof.

The grate is composed of revolving grate-bars J which may be of any suitable formation. The heat and products of combustion rising from the fire on the grate pass between the arches $b$, and around the tubes $c$ being compelled to traverse among said tubes by the "bridge wall" and fire back section C. After passing over the bridge wall they are caused to descend to enter the flue. Owing to the vertical position of the tubes they are subjected to the radiant heat from the fire, as well as direct contact with the heated gases rising from the fuel, and the entire surface of the inner sections, except the inner half of the legs and arch is utilized as heating surface. The tubes being vertical there is very little or no space left for lodgment of cinders, and all parts of the furnace are readily accessible for cleaning or repairs.

It will be apparent that the size of the heater can be enlarged or diminished by increasing the number of, or removing some of sections B. And should any section become defective it can be easily removed or replaced without taking down other sections of the furnace. Or a defective section can have the water supply cut off, and the remaining sections of the furnace kept in operation.

Having described my invention, what I claim as new, and desire to secure by Letters Patent thereon, is—

1. For a sectional boiler, a water holding section having a pair of vertical legs $a, a$; top arch $a'$; an intermediate portion $b$, a series of vertical tubes $c, c$, connecting portion $b$ and arch $a'$; and ribs $d$; and a hollow limb connecting the legs below portion $b$; and the plates and doors attached to one face thereof, substantially as and for the purpose set forth.

2. For a sectional boiler, a water holding section having a pair of vertical legs $a, a$, a top arch $a'$, an intermediate portion $b$, a series of vertical tubes $c, c$, connecting portion $b$ and arch $a'$, and ribs $d$, and having a transverse hollow partition C' below portion $b$ and communicating therewith and with the legs, and webs $c'$ between tubes $c$, substantially as specified.

3. A water or steam heater composed of a series of non-communicating independent sections A, B, C, and A' each having a pair of vertical legs communicating at their upper ends through a tubular top piece, and below said top through a transverse tubular portion having recesses $b'$ in its face, and said tubular portion and top communicating through a series of vertical tubes; with the supply pipe and the drum, and independent connections between each of said sections and the said drum and supply pipe, substantially as specified.

In testimony that I claim the foregoing as my own I affix my signature in presence of two witnesses.

GEORGE H. HERSEY.

Witnesses:
S. E. SCRANTON, Jr.,
B. L. STRADLING.